United States Patent [19]
Webb

[11] 4,065,237
[45] Dec. 27, 1977

[54] VALVE APPARATUS FOR EXPANSIBLE CHAMBER

[75] Inventor: Walter J. Webb, Cincinnati, Ohio

[73] Assignee: The Scott & Fetzer Company, Lakewood, Ohio

[21] Appl. No.: 687,098

[22] Filed: May 17, 1976

[51] Int. Cl.² ............... F16K 15/16; F04B 21/00
[52] U.S. Cl. ......................... 417/503; 417/571; 137/512.1
[58] Field of Search ............ 417/502, 503, 504, 571, 417/442, 566; 137/512.1, 512.3, 110; 123/188 AP

[56] References Cited

U.S. PATENT DOCUMENTS

| | | | |
|---|---|---|---|
| 157,791 | 12/1874 | Cameron | 137/512.1 |
| 919,036 | 4/1909 | Langer | 137/512.1 |
| 2,089,630 | 8/1937 | Teeter | 417/503 |
| 2,463,766 | 3/1949 | Hadley | 417/571 |
| 2,908,287 | 10/1959 | Augustin | 417/571 |
| 3,112,064 | 11/1963 | Ayling | 417/571 |
| 3,259,308 | 7/1966 | Bennett | 417/503 |
| 3,415,441 | 12/1968 | Kehler | 417/503 |
| 3,536,094 | 10/1970 | Manley | 137/512.1 |
| 3,679,332 | 7/1972 | Yohpe | 417/503 |
| 3,679,333 | 7/1972 | Zoppi | 417/571 |
| 3,829,253 | 8/1974 | Bunn et al. | 137/512.1 |

Primary Examiner—William L. Freeh
Attorney, Agent, or Firm—Wood, Herron & Evans

[57] ABSTRACT

Improved valve apparatus for expansible chamber devices, such as reciprocating piston compressors, includes in a preferred embodiment, a chamber having two chamber intake ports, each normally closed by a respective valve member. A first valve member is biased to close a first port, and a second member is more forcefully biased to close a second port which is larger in cross-sectional area than the first port. The first valve member opens the first port in response to an intake pressure differential less than that which will open the second port. Subsequently, and upon increased intake pressure differential, the second valve member opens the second port and reduces the working pressure affecting the first valve. This permits the first valve to positively close its port at or near the end of the suction stroke of the piston, the second valve also closing its port due to the more forceful bias. Reverse "gushing" is thereby significantly reduced and minimized, or totally prevented, while at the same time, initial intake is facilitated to reduce or eliminate starving. Valve plates and inlet restrictors are eliminated, and overall output and efficiency are significantly improved. The valving apparatus of the invention may also be used in connection with chamber exhaust for further increased efficiency.

25 Claims, 14 Drawing Figures

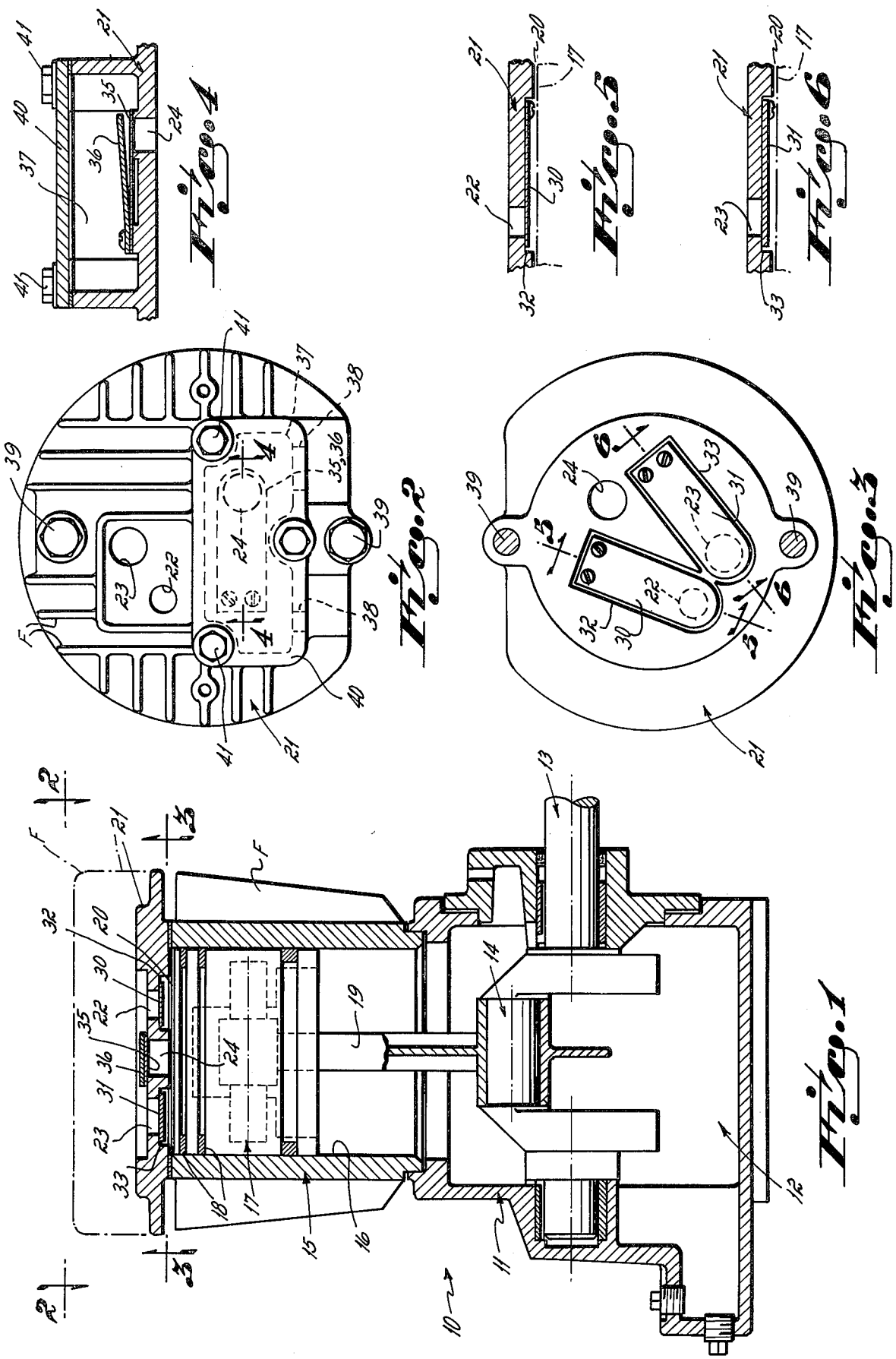

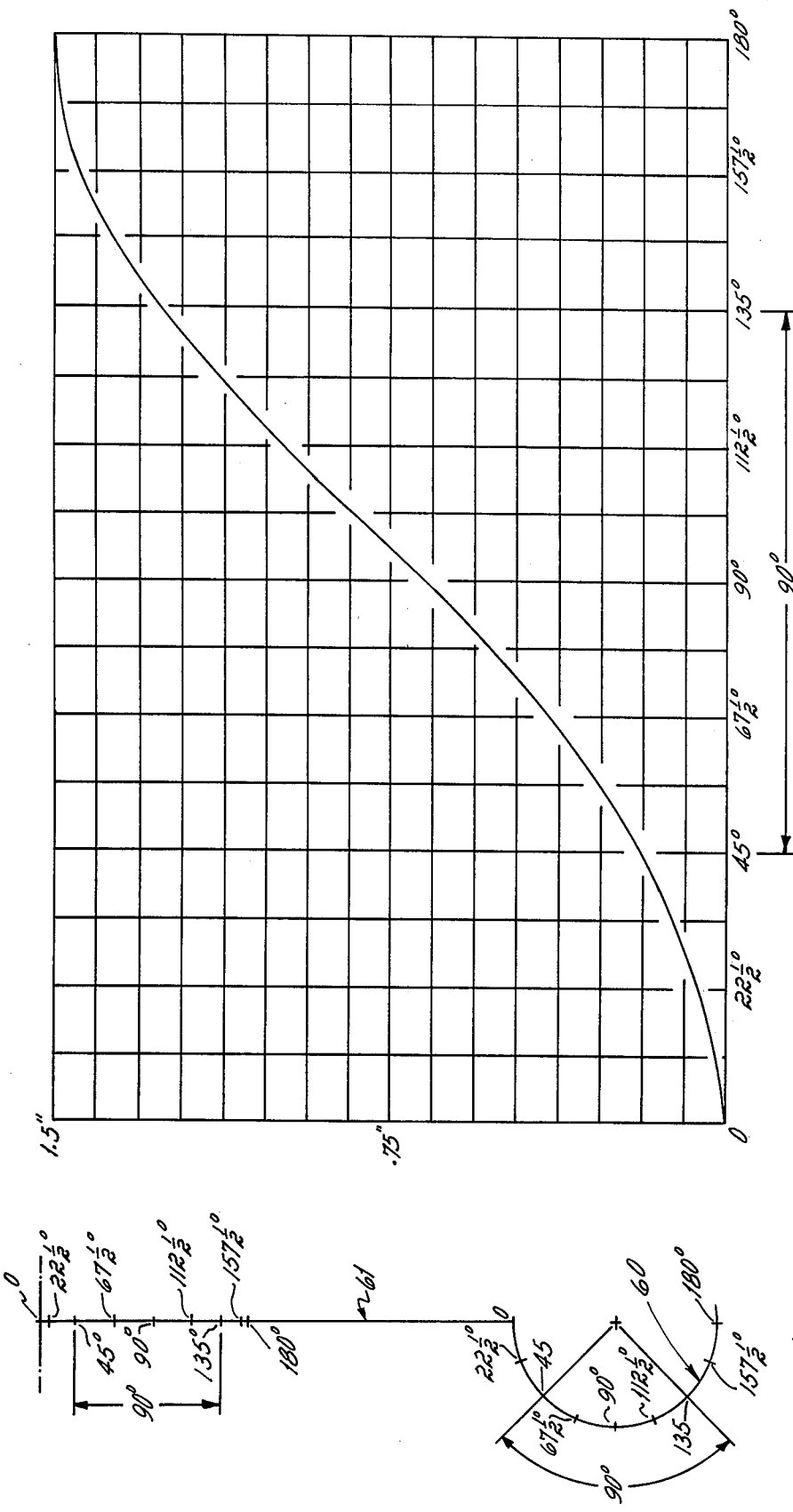

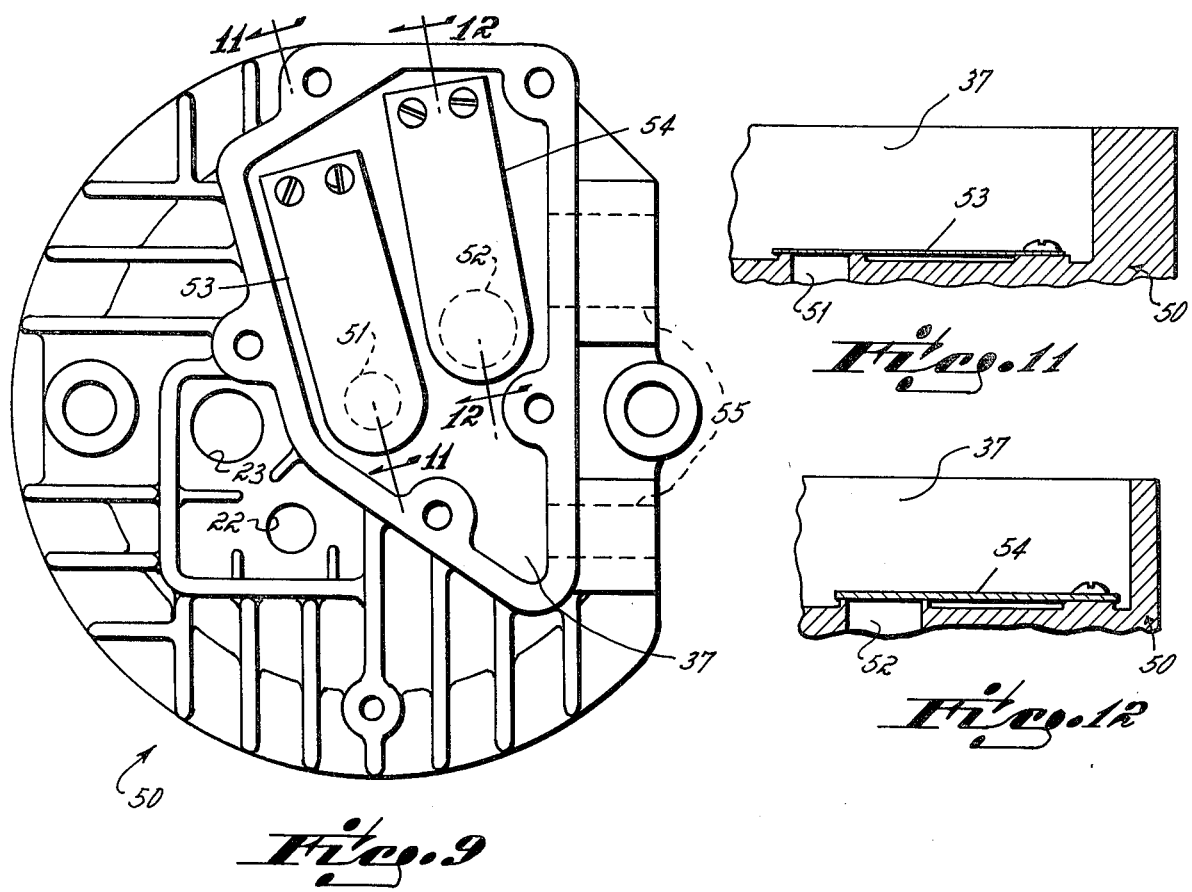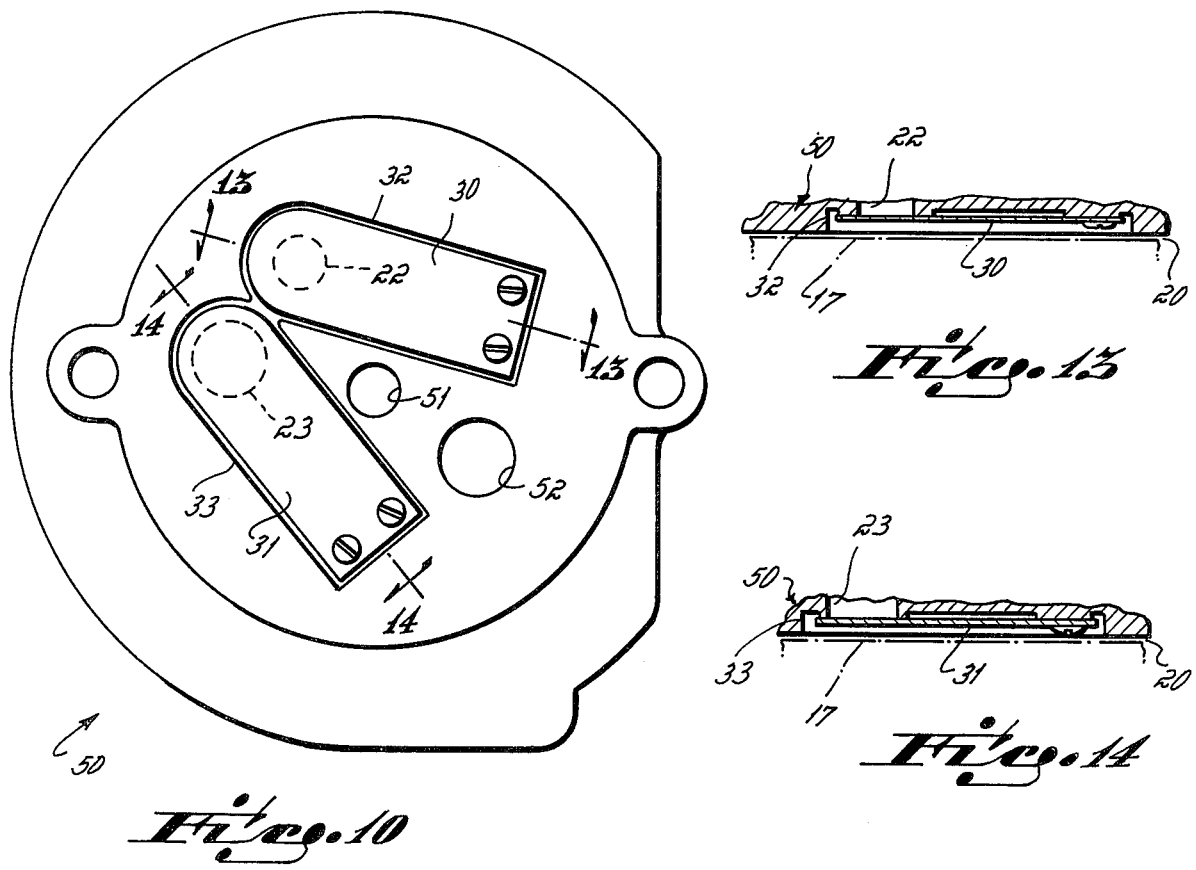

VALVE APPARATUS FOR EXPANSIBLE CHAMBER

This invention relates to valving apparatus and more particularly to improved valving apparatus for expansible chamber apparatus such as fluid air compressors.

In a now typical air compressor of the reciprocating piston type, air is drawn into a compression chamber, via a valved intake port or ports, and is then compressed by the moving piston and exhausted via a valved exhaust port or ports. Such a compressor generally comprises a housing forming a cylinder defining the walls of the compression chamber, a valve plate defining a portion of one end of the compression chamber and on which the exhaust valve and intake valve restrictors are located, a head on which intake flapper valves are mounted, and a reciprocating piston. Thus, intake ports in the head are normally closed by flexible flapper valves mounted on the head. When the piston is moved through a suction stroke to expand the chamber, the intake flappers flex, in response to the intake pressure differential, and open the port or ports. To prevent over-flexing, the valve plate provides restrictors or restrictor surfaces which the flappers engage at a predetermined point. Thereafter, upon a compression stroke, the intakes are closed and the exhaust is opened.

Such a compressor is susceptible to output and performance inefficiencies due to a number of its design characteristics. For example, it is necessary to compromise on the design of the intake flapper valves themselves. If the flexible intake flapper or flappers are too thick or stiff, they will not open as quickly as desired upon the beginning of a suction stroke and the compressor "starves". On the other hand, a certain minimal stiffness is desired so that the flappers will close as quickly as possible at the end of the suction stroke. Otherwise, excessive reverse "gushing" will occur; air will be forced out of the still-open intake ports.

Thus, the intake flapper design must be compromised between a flexibility permitting as quick an opening as possible upon a suction stroke, and a sufficient stiffness for insuring quick positive closing at the end of the suction stroke. Due to this design compromise, maximum valve opening and closing performance efficiencies are not realized, and potential air output is not attained.

Secondly, compressor efficiency is affected adversely by any "dead air" which remains in the chamber and above the piston when the piston is at its uppermost position. This air must be expanded before sufficient intake or negative chamber pressure is produced on a suction stroke to open the intake valves. Thus, the efficiency of the compressor is decreased relative to the volume of dead air. In a typical compressor, undesired dead air space is inherent due to insertion of the valve plate between piston head and cylinder to provide intake valve restrictors.

A third performance inefficiency in typical compressors is realized in flapper failure due to overworking despite restrictors. The compromised flapper is worked excessively, even with the use of a restrictor, so that its fatigue life is a factor in compressor maintenance.

Accordingly, it has been one objective of the present invention to increase the output and the efficiency of expansible chamber apparatus such as air compressors.

A further objective of the invention has been to provide improved intake valve apparatus for expansible chamber apparatus such as a compressor.

A further objective of the invention has been to provide an improved compressor head for an air compressor.

A further objective of the invention has been to improve the fatigue life of flapper valves in an expansible chamber environment.

A still further objective of the invention has been to provide improved exhaust valve apparatus for an expansible chamber apparatus such as a compressor.

To these ends, a preferred embodiment of the invention contemplates a reciprocating piston air compressor having an improved compressor head including two inlet ports of differing cross-sectional area and a flapper valve operably closing each port. A first flapper valve is biased to close the smaller port but with a lesser closing bias or force than that of a second flapper biased to close the larger port. Upon the beginning of a chamber expansion (or piston suction) stroke, the compressor piston's acceleration is relatively low and the intake pressure differential increases slowly. Despite this, the first flapper quickly opens to prevent chamber "starving". As the piston's acceleration increases, a substantially increased intake pressure differential is produced and the second flapper is opened. When the second flapper opens the larger port, the working pressure affecting the first flapper valve is reduced, and that valve can then easily close its smaller port when the piston decelerates toward the end of the suction stroke and the intake pressure differential is reduced. On the other hand, the second flapper, by virtue of its greater closing bias, also readily closes and reverse "gushing" is significantly minimized or prevented. The improved valve apparatus permits both free initial intake and positive closing without inefficient design compromises, the second valve permitting the first to positively close without significant reverse "gushing" and the first eliminating starving, to which the second valve alone would ordinarily be susceptible. The two valves thus cooperate to produce a unique and improved valving operation, thereby significantly enhancing compressor output.

Moreover, it has been found that the present invention also substantially increases compressor efficiency. That is, while the modified compressor's output is significantly increased, power input, driving motor temperature rise, and compressor head temperature rise all remain significantly the same as those realized in the same compressor having a prior typical and non-improved inefficient valving apparatus as described herein.

Further, fatigue life of the flapper valves is improved. Since the combined functioning of the valves reduces the flexing requirements of each, neither valve need be flexed to its capacity.

Moreover, this permits elimination of the intake valve restrictors or restrictor surfaces normally provide on a valve plate. Accordingly, the valve plate can be eliminated, consequently resulting in a reduction of "dead air" space over the piston. Efficiency is further increased, while at the same time compressor manufacturing cost is either substantially maintained or reduced.

In an alternate embodiment, the above valving concept is used in connection with expansible chamber exhaust valving to provide further operational efficiencies. Thus, an improved exhaust valve means contemplates two exhaust ports differing in cross-sectional area and covered by respective flappers biased with different forces, similarly to the preferred embodiment, to normally close the ports during a suction stroke. Such an exhaust valve apparatus further improves output and efficiency; it permits positive, quick closing of the exhaust ports near the end of the piston's exhaust or compression stroke and facilitates port opening at the beginning of the exhaust stroke, the two ports and flappers cooperating together to produce a unique valving operation similar to that of the improved intake valve apparatus described herein.

Thus, the invention can be utilized in connection with intake, exhaust, or both, to significantly improve the efficiency and the output of expansible chamber apparatus.

These and other objectives and advantages will become readily apparent from the following detailed description of a preferred embodiment and from the drawings in which:

FIG. 1 is a cross-sectional view of an expansible chamber apparatus according to the invention, but showing the ports in the head rotated from their actual position for clarity;

FIG. 2 is a top view of the head taken along lines 2—2 of FIG. 1 but showing the ports in the head in their actual position;

FIG. 3 is a bottom view of the head taken along lines 3—3 of FIG. 1 but illustrating the ports in their actual position;

FIG. 4 is a cross-sectional view taken along the lines 4—4 of FIG. 2;

FIG. 5 is a cross-sectional view of a first flapper valve and inlet port taken along lines 5—5 of FIG. 3;

FIG. 6 is a corss-sectional view of a second flapper valve and inlet port taken along lines 6—6 of FIG. 3;

FIG. 7 is a diagrammatic illustration of the typical piston suction stroke and of the corresponding partial locus of the crankshaft shaft throw;

FIG. 8 is a graph plotting the typical piston suction stroke against the angular rotation of the crankshaft to illustrate piston acceleration and deceleration;

FIG. 9 is a top view of an alternate embodiment of the invention and shows a compressor head incorporating improved exhaust apparatus;

FIG. 10 is a bottom view of the head of FIG. 9;

FIG. 11 is a cross-sectional view taken along lines 11—11 of FIG. 9;

FIG. 12 is a cross-sectional view taken along lines 12—12 of FIG. 9;

FIG. 13 is a cross-sectional view taken along lines 13—13 of FIG. 10; and

FIG. 14 is a cross-sectional view taken along lines 14—14 of FIG. 10.

Turning now to the drawings, FIG. 1 thereof depicts in cross-section an expansible chamber device comprising in a preferred embodiment a driven air compressor 10. The compressor essentially comprises a lower casing 11, surrounding a sump 12 and, rotatably mounted by appropriate bearings, a driven crankshaft 13 including an eccentric 14. The compressor further comprises a housing 15 defining in part a cylinder 16. A piston or working member 17 is movably mounted in the cylinder 16 and is slidably sealed to the cylinder walls by appropriate piston rings 18. The piston is attached to the crankshaft eccentric 14 by means of a rod 19 so that as the crankshaft is turned, the piston reciprocates within the cylinder.

The compressor further includes an expansible compression chamber or working chamber 20, defined in part by the cylinder walls 16 and the upper working face of the piston 18. The upper end of the expansible chamber 20 is defined by a compressor head 21 which is sealingly engaged with the housing 15.

In FIG. 1, the compressor head 21 is somewhat diagrammatic in that the ports are shown in axial alignment for clarity in showing features of the apparatus. The actual position of the ports in the head 21, relative to the cylinder 16, is best shown in FIGS. 2 and 3 which correspond to the FIG. 1 cylinder orientation and illustrate the ports in the head 21 in their appropriate angular relationship.

As illustrated in FIG. 1, the head 21 includes a first intake port 22, a second intake port 23, and an exhaust port 24. As shown in the drawings, each of the intake ports 22, 23 open to the atmosphere which comprises a common pressure fluid source for the compression chamber. A first valve member 30 is disposed on the underside of the head 21 in operative relationship with the inlet port 22. Similarly, a second valve member 31 is disposed on the underside of the head 21 in operative relationship with the intake port 23. Each of these valve members preferably comprises a flexible flapper valve. Of course, it is well within the scope of the invention to use other types of differential valve systems such as, for example, spring biased discs or other means.

The bottom or underneath side of the head 21 (FIG. 3) is provided with respective recesses 32 and 33 which generally conform to the shape of the flapper valves 30 and 31, and in which the flapper valves reside as best seen in FIGS. 5 and 6. The recesses are preferably deep enough to contain the complete thickness of the flapper valves. Each of the flapper valves is secured, as shown, at one end by appropriate fastener means and each is flexible in response to different intake pressure differentials (i.e., differentials between chamber pressures in the chamber 20 and pressures on the other side of the valves) to uncover its respective port.

More specifically, in one preferred embodiment of the invention, each of the flapper valves is made from similar material. One form of material which has been found to be particularly appropriate for flapper valve usage is the pretempered flapper valve steel material manufactured by the Sandvik Company of Sweden. This material is manufactured to exceptionally close tolerances and flatness and to an exceptionally fine finish as known in the industry. The flapper valves are stamped from sheets of this material.

As best seen in FIGS. 5 and 6, the flapper valve 30 is significantly thinner than the flapper valve 31. Assuming that the flapper valves are made from the same type of material, the flapper valve 30 is thus more flexible than flapper valve 31. Thus, flapper valve 31 is forced to normally close port 23 with a greater closing bias or force than that exerted against port 22 by flapper 30.

In addition, it should be noted that in a preferred embodiment of the invention, the first intake port 22 is of lesser diameter, and therefore of lesser cross-sectional area, or flow capacity, than the second intake port 23. Accordingly, potential intake flow capacity is greater through port 23 than through port 22.

Proceeding with the description of the compressor, the head 21 is also provided with a flexible exhaust valve 35 operatively disposed on the head 21 to cover the exhaust port 24. In one embodiment of the invention where only a single exhaust port is utilized, a restrictor 36 can also be used, as shown in FIG. 4, to limit movement of the flexible valve 35.

As shown in the drawings, the exhaust 24 communicates between the expansible compression chamber 20 and an enclosed exhaust chamber 37 formed on the upper side of the head 21 and by cover 40, secured by bolts 41. The exhaust chamber 37 is provided with an appropriate outlet 38 for connection of the compressor to a compressed air accumulating tank (not shown).

Of course, while the intake ports 22 and 23 as shown in FIG. 2 are uncovered, appropriate filter means may be provided in order to eliminate the introduction of undesirable foreign matter into the expansion chamber.

The compressor head 21 is secured to the housing 15 or the cylinder 16 by means of appropriate bolts 39. Also, both the housing 15 and the cylinder head 21 can be provided with appropriate cooling fins F as desired.

In order to provide an even more detailed understanding of one embodiment of the inventon, as in FIGS. 1–6, a single cylinder compressor shown therein incorporates a cylinder 16 having an internal diameter or bore of 2 ¾ inches. The piston 17 fitted therein has a reciprocal stroke approximately 1 ½ inches in length. Each of the flapper valves 30 and 31 is approximately 2 inches long. The thinner flapper valve 30 is approximately 0.008 inches thick, and the thicker flapper valve 31 is approximately 0.015 inches thick. The smaller intake port which is associated with the thinner flapper valve 30 is approximately ⅝ inches in diameter, and the port associated with the thicker flapper valve 31 is approximately ½ inch in diameter. The exhaust port is approximately ½ inch to ⅝ inches in diameter; variation of the exhaust port within this range apparently does not significantly affect the operation of the compressor of this specific embodiment. The invention is also readily adaptable to multiple cylinder compressors. For example, in one twin cylinder compressor (not shown) each of the two cylinders has a bore diameter of 2 ¾ inches. The stroke of each piston is approximately 2 inches in length. Flapper valve and port dimensions are the same as in the single cylinder compressor described above.

Of course, the above compressors are described by way of example only, and it should be appreciated that the invention can be readily adapted to compressors of other sizes or numbers of cylinders as well as to any form of expansible chamber devices such as motors, pumps and the like, or to other environments in which improved valve operation is useful. In addition, it should be appreciated that it is within the scope of the invention to alter and modify the details and dimensions of each of the flapper valves and the inlet port sizes to tune them to obtain maximum efficiency for any form of expansible chamber device. Thus, the sizes and dimensions given for the above exemplary compressors are for example only.

In another aspect of the invention, it should be appreciated that the invention is readily adaptable to expansible compression chamber devices, such as compressors, simply by the substitution of a compressor head, modified according to the invention, for the prior art head or head and valve plate combination of existing compressors. Accordingly, the invention provides an improved head for an expansible compression chamber device such as a compressor.

In still another aspect of the invention, expansible chamber exhaust valve devices are improved. FIGS. 9–14 depict a compressor head 50 modified according to the invention. The head 50, and portions thereof are shown to include the previously described intake valve apparatus, and thus ports of head 50 similar to those in FIGS. 1–7 will be identified by like numbers.

Compressor head 50 includes intake valve and port apparatus as previously described herein. Additionally, it further includes first and second exhaust ports 51 and 52, best seen in FIG. 10, and first and second exhaust flapper valves 53 and 54 disposed in enclosed exhaust chamber 37 (shown with cover plate removed).

Enclosed exhaust chamber 37 is provided with one or more appropriate outlets or passageways 55 for connection of the exhaust (compressed air) to an accumulator tank, tool or the like.

As shown in the drawings, the first exhaust port 51 is of lesser diameter and cross-sectional area than exhaust port 52. Also, as shown, flapper valve 53 is thinner than flapper valve 54 and, when made from the same materials, flapper valve 54 is biased to normally close port 52 with a greater force than the closing bias exerted on port 51 by flapper 53. The flapper valves are each secured at an end opposite their port covering ends, by appropriate fasteners, and each is somewhat flexible and responsive to a different exhaust pressure differential to open their associated ports.

By way of example, in one form of this embodiment, the flappers 53 and 54 are made from the same specially prepared material as previously described and are about 2 inches long. Flapper 53 is about 0.008 inches thick while flapper 54 is about 0.015 inches thick. Port 51 is about ⅝ inches in diameter while port 52 is about ½ inch in diameter.

The head 50, as shown, is adaptable to a single cylinder compressor, such as shown in FIG. 1 having the dimensions described in connection with the foregoing description of the intake valve apparatus. Of course, the improved exhaust valve apparatus described could be adapted to compressors of multiple cylinders, or to other expansible chamber environments or environments in which such improved exhaust valve apparatus would be useful.

OPERATION

The operation of the invention described herein is more readily understood having reference to FIGS. 7 and 8. FIG. 7 diagramatically depicts the partial angular rotation or locus of the center line reference point of the crankshaft eccentric (i.e., pivot center point of piston rod to crankshaft eccentric) and also diagramatically relates the position of the top of the piston to the angular position of the center-line reference point of the crankshaft eccentric. Accordingly, when the reference point of the crankshaft eccentric is at 0° (or top dead center) on the semicircular reference locus 60, the top of the piston is located at its highest point in the cylinder 16, marked at 0° at the upper end of FIG. 7 on vertical reference line 61. The top dead center position of the piston is also shown in both FIGS. 1, 5 and 6.

As the crankshaft rotates in a counterclockwise manner, as shown in FIG. 7, it pulls, via the rod 19, the piston downwardly along a vertical path represented by line 61. Thus, when the center-line reference point of the crankshaft eccentric has rotated 22 and ½° for example, as shown in the lower portion of FIG. 7, the piston has been pulled downwardly to the corresponding point identified on line 61 at 22 and ½°. When the reference point is rotated through 45°, for example, the top of the piston is moved further downwardly to the point indicated at 45° on line 61, and so on, until the crankshaft has rotated through 180°. At this point, the piston is at its lowest point in the cylinder, the position of the piston top being indicated at the point 180° on line 61.

As shown in both FIG. 7 and FIG. 8, the acceleration of the piston from its top dead center position (0°) to its bottom dead center position (180°) varies. This is due to the fact that the crankshaft speed is constant, but the centerline reference point of the crankshaft eccentric is moving in a generally circular direction while the piston is moving in a straight line.

A graph of the piston's acceleration is shown in FIG. 8. Thus, for a piston having a total stroke length of about 1.5 inches, when the crankshaft has rotated 22 and $\frac{1}{2}$°, the piston has only moved approximately 0.06 inches. As the crankshaft eccentric, however, begins to move through 45° toward 135°, the acceleration of the piston increases, thus from a 45° piston of the crankshaft to a 135° position of the crankshaft, the piston has travelled approximately 1.09 inches of its total 1.5 inch stroke. Thus, the piston moves over two thirds of its total stroke length during a time when the crankshaft is only moving through one half of its 180° cycle. As the crankshaft rotates through 157 and $\frac{1}{2}$° toward 180°, the piston decelerates until its bottom dead center position (180°) is reached. Accordingly, initial and final acceleration and deceleration of the piston is a relatively low value, while the intermediate acceleration of the piston is relatively high.

Accordingly, it will be appreciated that in compressors modified according to the invention, when the piston first begins its suction stroke, i.e., from 0° or top dead center toward the 22 $\frac{1}{2}$° position, piston acceleration is relatively slight. At this time, the exhaust valves of the compressor head are closed and the only potential passage for air into the expansion chamber 20 is through the inlet ports 22 and 23. The second flapper valve 31, however, is relatively stiff and is constructed so that it is not open upon initial downward movement of the piston. On the other hand, the thinner flapper valve 30 is less stiff, and the initial intake pressure differential created in the expansion chamber by the withdrawing piston is sufficient to flex the flapper valve 30 and thereby open the port 22 to permit air to be sucked into the expansion chamber 20. This prevents starvation.

As the piston begins to rapidly accelerate, however, the size of the port 22 is not large enough to fully supply the air demanded. Accordingly, the intake pressure differential is increased sufficiently to flex the flapper valve 31 and open the larger port 23. When the larger port 23 is opened, more intake flow capacity than is needed for the chambers described herein is provided and accordingly, the working pressure on the first flapper valve is somewhat reduced. Thus, as the piston begins to decelerate at the bottom of its intake stroke, the thin flapper valve 30 is permitted to positively close due to the decreased force operating on it which is a result of the decreased port size. Also, toward the end of the piston intake stroke, the relatively stiff flapper valve 31 positively closes, due to its more forceful bias, and thus the ports 22 and 23 are positively closed at a time preferably before the piston its upward compression stroke, or at a time which eliminates any significant reverse "gushing". When the piston begins its exhaust stroke, the exhaust valve opens port 24 in response to a pressure differential between the pressure in chamber 20 and that on the other side of the valve.

Accordingly, it shall be appreciated that the combined valving structure disclosed herein facilitates initial air intake for the relatively slowly accelerating piston at the beginning of its suction stroke, and yet achieves positive valve closing so as to prevent or significantly minimize reverse "gushing" when the piston reaches its bottom dead center position and begins its exhaust stroke.

In the single cylinder compressor of FIGS. 1-6, having the dimensions described herein, air output is increased about 10% over the same compressor having a head which has not been modified as provided herein. For example, when such a prior compressor is driven by a $\frac{1}{2}$ horsepower motor at about 887 compressor crankshaft r.p.m., its output is approximately 2.7 c.f.m. However, when the same compressor is fitted with an improved head 21, its air output is increased to about 3.0 c.f.m.

Likewise, in a prior twin cylinder compressor having the chamber and stroke dimensions specifically described herein, output has been about 7.8 c.f.m. when driven by a 2 horsepower motor at 780 compressor crankshaft r.p.m. When this same compressor is modified by the use of a head incorporating the valve improvements described herein, output is increased to about 8.3 c.f.m. In this compressor, it has been found that peak efficiency is reached in the compressor crankshaft speed range of 600-1000 r.p.m., and more particularly at 850-900 r.p.m.

Despite the fact that compressors or other expansion chamber devices, improved as taught herein, produce a significantly increased output (and in the specifically described compressors above, this amounts to approximately 10% increase) the operating parameters of the compressor systems have remained substantially the same. For example, the temperature rise of the driving motor has remained substantially the same for the improved compressor and head as it was for the prior compressor operating at lesser efficiency. The temperature rise of the compressor head was only approximately 5°-10° F, this rise being totally insignificant when considering that the compressor head normally operates in the temperature range of 450°-500° F. Also, the wattage or power requirements of the driving motor remains significantly the same, despite increased output. Thus compressor efficiency is significantly improved.

In addition, further modification of an expansible chamber device as illustrated in FIGS. 9-14 provides further output and efficiency increases. This exhaust valve apparatus operates in a similar way to that of the intake valves. When the piston begins its compression or exhaust stroke, initial acceleration is low. Yet upon initial generation of exhaust pressure in excess of that pressure and bias acting against the flapper 53, the flapper will open to permit initial ejection of air from the chamber 20. When upward piston acceleration increases, working pressure on flapper 54 causes it to also open, at which time working pressure on flapper 53 is reduced. Thus when the piston decelerates, both valves can close at an appropriate time, preventing or significantly minimizing reverse "gushin".

Finally, it should also be noted that since no intake restrictors are required, the piston 17 can be brought very close to head 21 as shown in FIGS. 1 and 5. This serves to reduce the amount of dead air space above the piston to promote increase efficiency and output.

Accordingly, the invention provides improved valving apparatus for an expansible chamber device and which significantly improves the output capacity and efficiency of the device without significantly increasing the power input requirements or the temperature rise characteristics of the system.

Moreover, the invention provides an improved compressor head which can be substituted for a typical compressor head and valve plate assembly of existing compressors to significantly increase output and efficiency.

These and other alterations and modifications will become readily apparent to those of ordinary skill in the art without departing from the scope of the invention, and applicant intends to be bound only by the claims appended hereto.

I claim:

1. In an expansible compression chamber apparatus operatively connected to intake means and to exhaust means, and having an expansible chamber defined in part by a cylinder head, an improved intake valve apparatus connecting said chamber to a common pressure fluid source and comprising:
   two laterally spaced intake ports in said head defining said intake means, said ports operatively connected to said expansible compression chamber and through which a fluid to be compressed is introduced into said chamber from said common pressure fluid source,
   a first valve member disposed and biased to normally positively close one intake port, said first valve member opening said one port in response to a first intake pressure differential, and
   a second valve member spaced from the first valve member and disposed and biased to normally positively close another of said intake ports, said second valve member opening said other port in response to a second intake pressure differential different from said first intake pressure differential.

2. Apparatus as in claim 1 wherein said expansible compression chamber comprises a driven air compressor.

3. Apparatus as in claim 1 wherein opening of said second port reduces the intake pressure differential otherwise exerted on said first valve member.

4. Apparatus as in claim 1 wherein said valve members are flapper valves, wherein said ports are disposed in a head member defining a portion of said expansible compression chamber, and wherein said head includes flapper valve recesses, said flapper valves being disposed in said recesses.

5. Apparatus as in claim 1 wherein said first and second valve members positively close said intake ports in sufficient time to minimize fluid from exhausting from said chamber through said intake ports.

6. Apparatus as in claim 1 wherein said first intake port is smaller in cross-sectional area than said second intake port.

7. Apparatus as in claim 6 wherein said valve members are flapper valves.

8. Apparatus as in claim 7 wherein said first flapper valve is thinner than said second flapper valve.

9. Apparatus as in claim 8 wherein said first port is circular and about ⅜ inches in diameter and wherein said second port is circular and about ½ inch in diameter.

10. Apparatus as in claim 9 wherein said first flapper valve is about 0.008 inches thick, said second flapper valve is about 0.015 inches thick, and both of said flapper valves are about 2 inches in length.

11. Apparatus as in claim 10 wherein said expansible chamber comprises a cylinder having a diameter of about 2 ¾ inches, and wherein a reciprocating piston, having a stroke length in the approximate range of about 1 ½ inches to about 2 inches, is movably mounted in said cylinder to alternately enlarge and reduce the volume of said chamber.

12. Apparatus as in claim 11 wherein said exhaust means comprises an exhaust port and valve means normally closing said exhaust port, but opening in response to an exhaust pressure differential.

13. Apparatus as in claim 12 wherein said exhaust port has a diameter of about ½ inches to about ⅝ inches.

14. In a compressor having a compression chamber operatively connected to intake means and to exhaust means, an improved intake valve combination connecting said chamber to a common pressure fluid source and through a compressor head and comprising:
   two intake ports in said head defining said intake means, and through which fluid to be compressed is introduced to said compression chamber from said common pressure fluid source,
   a first flexible intake valve member disposed and biased to normally positively close a first one of said intake ports, said first valve member opening said first port in response to a first intake pressure differential, and
   a second flexible intake valve member spaced from the first valve member and disposed and biased to normally positively close a second one of said intake ports, said second valve member opening said second port in response to a second intake pressure differential different from said first intake pressure differential.

15. Apparatus as in claim 14 wherein said valve members are flapper valves, and further including a compressor head, said intake ports being disposed therein, and said head including flapper valve recesses, said flapper valves being disposed in respective ones of said recesses.

16. Apparatus as in claim 14 wherein said first and second valve members positively close said intake ports in sufficient time to minimize fluid from exhausting from said chamber through said intake ports.

17. Apparatus as in claim 14 wherein opening of said second port reduces the intake pressure differential otherwise exerted on said first flexible valve member.

18. Apparatus as in claim 17 wherein said first intake port is smaller in cross-sectional area than said second intake port and said second intake pressure differential is greater than said first intake pressure differential.

19. Apparatus as in claim 17 wherein said first and second flexible intake valve members are flapper valves and wherein said first valve member is thinner than said second valve member such that it is biased closed with a lesser force than that with which said second valve member is biased closed.

20. An improved compressor head adapted for connecting a compression chamber to a common pressure fluid source and comprising:
   at least two spaced compressor intake ports in said head and an exhaust port in said head, said two intake ports each respectively opening on one side of said head to a common pressure fluid source, and on another side of said head to said compression chamber, a first intake valve member disposed on said head and biased with a first force to normally positively close a first one of said intake ports, a second intake valve member spaced from the first intake valve member and disposed on said head and biased with a second force to normally positively close a second one of said intake ports, and said second force being greater than said first force.

21. An improved compressor head as in claim 20 wherein said head comprises an integral single piece head member supporting said valve members.

22. Apparatus as in claim 20 wherein said first port is smaller in cross-sectional area than said second port.

23. Apparatus as in claim 20 wherein said valves are flexible flapper valves.

24. Apparatus as in claim 23 wherein said head includes valve receiving recesses.

25. Apparatus as in claim 24 wherein said flapper valves are disposed within respective recesses.

* * * * *

UNITED STATES PATENT AND TRADEMARK OFFICE
CERTIFICATE OF CORRECTION

PATENT NO. : 4065237
DATED : December 27, 1977
INVENTOR(S) : Walter J. Webb

It is certified that error appears in the above-identified patent and that said Letters Patent are hereby corrected as shown below:

Column 2, line 59, "provide" should be --provided--

Column 7, line 18, "piston" should be --position--

Column 7, line 52, "capacity" should be --capability--

Column 8, line 61, "gushin." should be --gushing.--

Signed and Sealed this

Sixth Day of June 1978

[SEAL]

Attest:

RUTH C. MASON
*Attesting Officer*

DONALD W. BANNER
*Commissioner of Patents and Trademarks*